United States Patent
Yssel

[15] 3,646,339
[45] Feb. 29, 1972

[54] PIVOTING DEVICES ALLOWING CONTINUOUS AUTOMATIC HEADLAMP ADJUSTING

[72] Inventor: Gideon Petrus Schoeman Yssel, "Sanitas," Noordbrug, Transvaal Province, Republic of South Africa

[22] Filed: June 24, 1969

[21] Appl. No.: 835,938

[52] U.S. Cl. .......................................................240/7.1 R
[51] Int. Cl. ...........................................................B60q 1/10
[58] Field of Search .....................240/7.1, 7.1 H, 7.1 LJ, 62.2

[56] References Cited

UNITED STATES PATENTS

| | | | |
|---|---|---|---|
| 1,988,894 | 1/1935 | Germain | 240/7.1 |
| 2,984,737 | 5/1961 | Marcellus | 240/7.1 LJ |
| 3,385,961 | 5/1968 | Lemberger | 240/62.2 X |

Primary Examiner—John M. Horan
Assistant Examiner—Kenneth C. Hutchison
Attorney—Karl W. Flocks

[57] ABSTRACT

A headlamp pivotally mounted about a transverse and horizontal axis on a resiliently suspended vehicle body for tilting movement relative to the relative movement of sprung and unsprung parts of the vehicle and having axially aligned parts engaging journals while with the journals axially directed compression springs are associated to take up slack or play. The invention also extends to incorporating a pivotal mounting in a member which applies controlled tilting movement to the headlamp. Furthermore the invention extends to the mounting of journals in spring clip devices with which lateral adjusting elements are associated.

3 Claims, 6 Drawing Figures

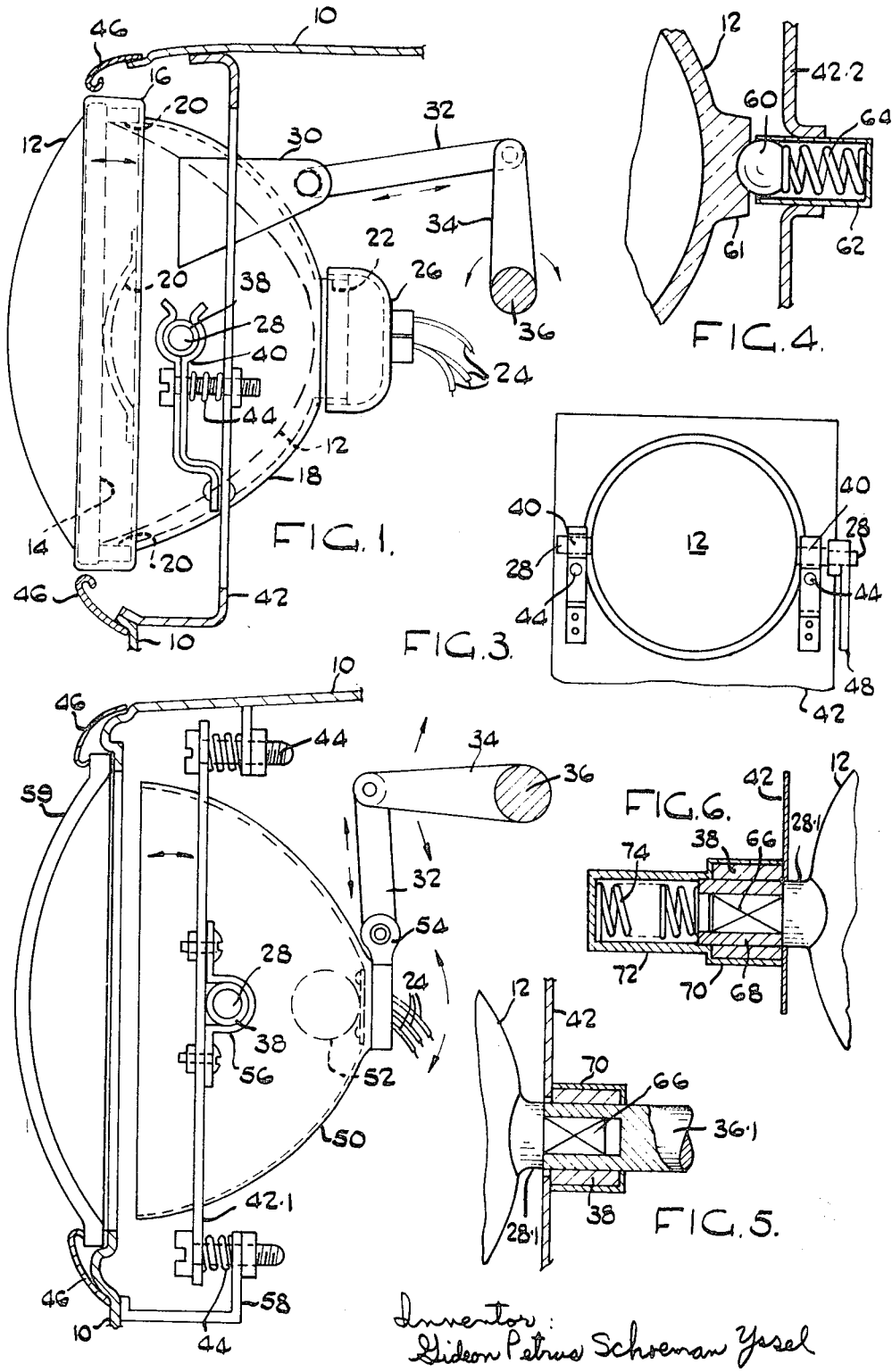

PIVOTING DEVICES ALLOWING CONTINUOUS AUTOMATIC HEADLAMP ADJUSTING

THIS INVENTION relates to devices for pivotally mounting headlamps of vehicles having means to automatically adjust the positions of the headlamps to direct light beams, emitted by the headlamp for illumination of the road ahead of the vehicle, at a required substantially constant distance under varying loaded conditions of the body of the vehicle.

When the load on a resiliently suspended body of a vehicle is at different positions or locations, and/or when a vehicle is rapidly accelerated or braked, the rear or front of the vehicle, as the case may be, will sag or rise and as a result of which the means angle of the light beams, relative to the road, changes and the road ahead is illuminated to near or to far away. When the downward deflection of the light beams is insufficient, drivers of approaching vehicles may be temporally blinded.

Mechanically, pneumatically and/or hydraulically operated means to effect headlamp tilting in accordance with vehicle body movements and relative to the unsprung parts of the vehicle at the front and/or rear of the vehicle, are known. It is also known to provide manually operated means whereby the lifting of the headlamps may be effected by the driver when in the driving position within the vehicle.

This invention relates particularly to the pivotal mounting of the headlamps of a vehicle while the tilting of the headlamps may be by any suitable means.

According to the invention a headlamp, mounted on a sprung vehicle body and adapted to be automatically adjusted in accordance with movement of the body relative to unsprung vehicle parts includes a unit composed of light emitting and light directing members mounted for pivotal movement about a horizontal transverse axis with the position of the center of gravity substantially coinciding with the horizontal axis.

The position of the center of gravity of the unit is determined when the electrical connections, and preferably also the flexible insulated conductors, are attached. By pivotting the unit about an axis passing substantially through the center of gravity position, self tilting of the unit will not be effected by changes in gradient road irregularities, braking or acceleration.

The said light emitting and directing units may comprise sealed or semisealed units or parabolic reflectors mounting filament lamps or bulbs. Such units may each be mounted in a casing or housing part which in turn is pivotally mounted on the vehicle body. The unit or the casing part for a unit is preferably pivotally mounted on the vehicle body in an laterally adjustable fashion.

According to one form of the invention each lamp unit may be secured in a casing having an internal shape corresponding substantially to the shape of the unit. Such securing of the unit is preferably by a rim region which is gripped by resilient clamping devices whereby such units may be readily slipped in position. Outwardly extending pivot pins are secured at diametrically opposite positions on the casing and are received in bearing forming members. On the casing an arm is provided which in turn is connected to a crank arm of a shaft or other member which is rotatably oscillated in accordance with relative movement of the sprung and unsprung parts of the vehicle by a mechanical, pneumatic, hydraulic and or like system. The operating part or parts of the system is or are advantagously associated with members connected to both the sprung and unsprung parts of the vehicle, preferably at the front and at the rear of the vehicle.

In an other form of the invention the pivot pins, preferably in the form of stub axles, are attached to or formed integrally with the light emitting and directing units.

Instead of providing the pivot pins on the said units they may be provided on a mounting for engagement in holes, depressions or other bearing forming means provided on the units.

The pivots for a lamp unit may comprises spring biassed elements slidably disposed in casings which are fixed to the units, unit casings or mountings, for biassed engagement in complementary recesses or bearing forming holes or devices in a coacting mounting, unit casing or the units, as the case may be.

Bearing forming members for pivot pins may comprise cliplike devices into or from which the pivot pins may be engaged in radial directions. Suitable material bushes can be provided on the pivot pins and which become clamped by the cliplike devices.

The bearing forming members may be secured to the vehicle body in a horizontal inward and outward displacable fashion for adjusting the headlamp in a lateral direction.

In order that the invention may be clearly understood and carried into effect, reference will now be made to the accompanying sheet of drawings.

In the drawings:

FIG. 1 is a sectional elevation of a headlamp and its mounting, according to the invention;

FIG. 2 is a view similar to FIG. 1, but showing a modification;

FIG. 3 is a front view of FIG. 1, drawn to a smaller scale, and incorporating a modification;

FIG. 4 is a fragmentary cross section through a sealed beam unit; showing a modified form of pivotal mounting for the unit; and FIGS. 5 and 6 are fragmentary sectional elevations showing still further modified forms for pivotally mounting a vehicle headlamp unit.

The vehicle body, denoted by reference numeral 10, provides forwardly directed openings in or behind which the headlamps are mounted or disposed.

In FIG. 1 a light emitting and directing unit of the sealed beam lamp kind is shown and denoted by numeral 12. The rim 14 of unit 12 is clampingly received in a circumferential recessed part 16 of a cup-shaped casing 18 by spring devices 20. An axially flanged central opening 22 of casing 18 is provided in the rear of casing 18 through which the insulated electrical conductors 24 extend from the unit 12 to switch controlled electric current means. Across the opening 22 a sealing cap 26 is provided and through which the conductors 24 sealingly extend.

On diametrically opposite sides of the casing 18 outwardly directed pivot pin forming stub shafts 28 are fixed. The positions of the stub shafts are at such portions that their axes pass through the center of gravity position of the assembly comprising the sealed beam unit 12, casing 18, conductors 24, cap 26 and an arm 30.

The arm 30, which is fixed to the casing 18 and extends outwardly, crank arm fashion, is connected by a link 32 to a crank arm 34 of an rotatable oscillatable control shaft 36. The shaft 36 is rotatingly oscillated by known means for rotational movement and in accordance with body sag at the front and rear of the vehicle relative to the wheels or wheel mountings.

The stub shafts 28 are provided with bushes 38 which in turn are clampingly engaged in clip devices 40 which in turn are secured to a mounting part 42. The mounting part 42 is fixed to the body 10. At least one of a pair of clip devices 40 is displacable in a substantially horizontal forward and rearward direction by a screw and spring combination 44 relative to the mounting 42 for lateral adjustment of the headlamp unit 12.

With this arrangement the light emitting and directing unit of each headlamp is separately mounted for pivotal movement, but all are pivoted or tilted at the same time and to the same extent and direction due to their connection to the shaft 36.

Instead of providing the arm 30 on the casing 18, a crank arm 48 can be provided and which is fixed to one stub shaft 28 for connection to the shaft 36, see FIG. 3. If desired both stub axles may be provided with a crankarm 28 for connection to the shaft 36.

In FIG. 2 the light emitting and directing unit comprises a parabolic reflector 50 which mounts a lamp 52 and a connecting element 54 for the link 32. The reflector 50 provides in-line and outwardly extending stub shafts 28, constructed integrally or fixed thereto. The in-line axes of the stub axes are arranged to pass through the center of gravity position of the assembly comprising the reflector 50, lamp 52, connecting element 54 and the electrical connecting conduits 24.

The stub axles are jo$rnaled in bushes 38 which are fixed by clamps 56 to a carrier or mounting 42.1 which in turn is attached by screw and spring assemblies 44 to rigid lugs or brackets 58, or a plate of the body 10.

The lens 59 is clamped to the body 10 by a ring 46 according to known practice.

By means of the screw and spring assemblies 44 the reflectors 50 and lamps 52 may be laterally adjusted.

As is shown in FIG. 4 the unit 12 may be provided with projections 61 at opposite sides and having recesses in the outwardly directed ends. The center lines of the recesses are disposed on an axis which passes through the position of the center of gravity of the unit. The recesses are engaged by spherical elements 60 extending from casings 62 and biased by springs 64. The casings are secured in carriers or mountings 42.2 attached, preferably adjustable, to the vehicle body as is shown in FIG. 2. On the unit 12 an arm 30 or 48, or other suitable connecting element 54, not shown, is provided for attachment of a link 32 or the like.

The form of the invention shown in FIG. 5 and 6 also provides stub shafts 28.1 on the unit 12. Such stub shafts 28.1 have noncircular end portions 66 for engagement in complementary shaped bores of a sleeve 68 and shaft 36.1. The ends of the shaft 36.1 and the sleeve 68 are journaled in bushes 38 supported in casings 70 which in turn are attached to carriers or mountings 42 which are adjustably attached to the vehicle body.

The casing on one side of the lamp provides an extension 72 housing a spring 74 whereby axially directed pressure is applied to the unit 12 and whereby slack or play may be taken up automatically.

The forms of construction shown in FIGS. 4, 5 and 6 may be applied when the unit 12 or the reflector 50 is mounted in a casing 18 or the like and in which case the projections 61 or the stub shafts 28.1 are provided on the casing 18. In a modified form such projections 61 or extensions can be provided on the reflector 50.

In the modified forms of the invention the light emitting units of both or all the headlamps of a vehicle may be served from a single shaft 36, or by different shafts which are separately oscillatably rotated.

I claim:

1. A headlamp for mounting on a resiliently supported body of a vehicle for adjustment in accordance with movement of the body relative to unsprung parts of the vehicle including a unit, comprising light emitting and light-directing members, which is pivotally mounted about a substantially horizontal transverse axis and having means for connection to a rotatably adjustable member adapted to apply tilting movement to the unit in accordance and relative to movement of the body relative to the unsprung vehicle parts wherein said unit is provided on opposite sides with axially aligned projections of noncircular cross-sectional shape for engagement in complementary shaped axial holes in cylindrical parts which are journaled in bearing means provided on a carrier attached to the vehicle body, at least one of the cylindrical parts being an end portion of a shaft which forms the member whereby tilting movement is applied to the unit and to the opposite end of which shaft a similar unit is connected in the same manner.

2. A headlamp for mounting on a resiliently supported body of a vehicle and adjustable in accordance with movement of the body relative to unsprung parts of the vehicle including a unit, comprising light emitting and light-directing members, which is pivotally mounted about a substantially horizontal transverse axis and having means for connection to a rotatably adjustable member adapted to apply tilting movement to the unit in accordance and relative to movement of the body relative to the unsprung vehicle parts, the unit have axially aligned pins for location in spring clip devices provided on a carrier which is mounted on the vehicle body, said devices providing for ready replacement and removal of the assembly whereas with said devices means are provided for their displacement and lateral adjustment of the unit.

3. A headlamp for mounting on a resiliently supported body of a vehicle for adjustment in accordance with movement of the body relative to unsprung parts of the vehicle including a unit, comprising light emitting and light-directing members, which is pivotally mounted about a substantially horizontal transverse axis and having means for connection to a rotatably adjustable member adapted to apply tilting movement to the unit in accordance and relative to movement of the body relative to the unsprung vehicle parts wherein said unit is provided with coaxial partly spherical recesses in opposite sides, said recesses being engaged by complementary shaped portions of spring loaded spherical elements adapted to form pivots for the unit, said spherical elements being biased towards one another and mounted on a carrier which in turn is adjustably mounted on the vehicle body for lateral adjustment of the unit; the common axis of the recesses passing through the position of the center of gravity of the unit.

* * * * *